United States Patent Office 3,546,667
Patented Dec. 8, 1970

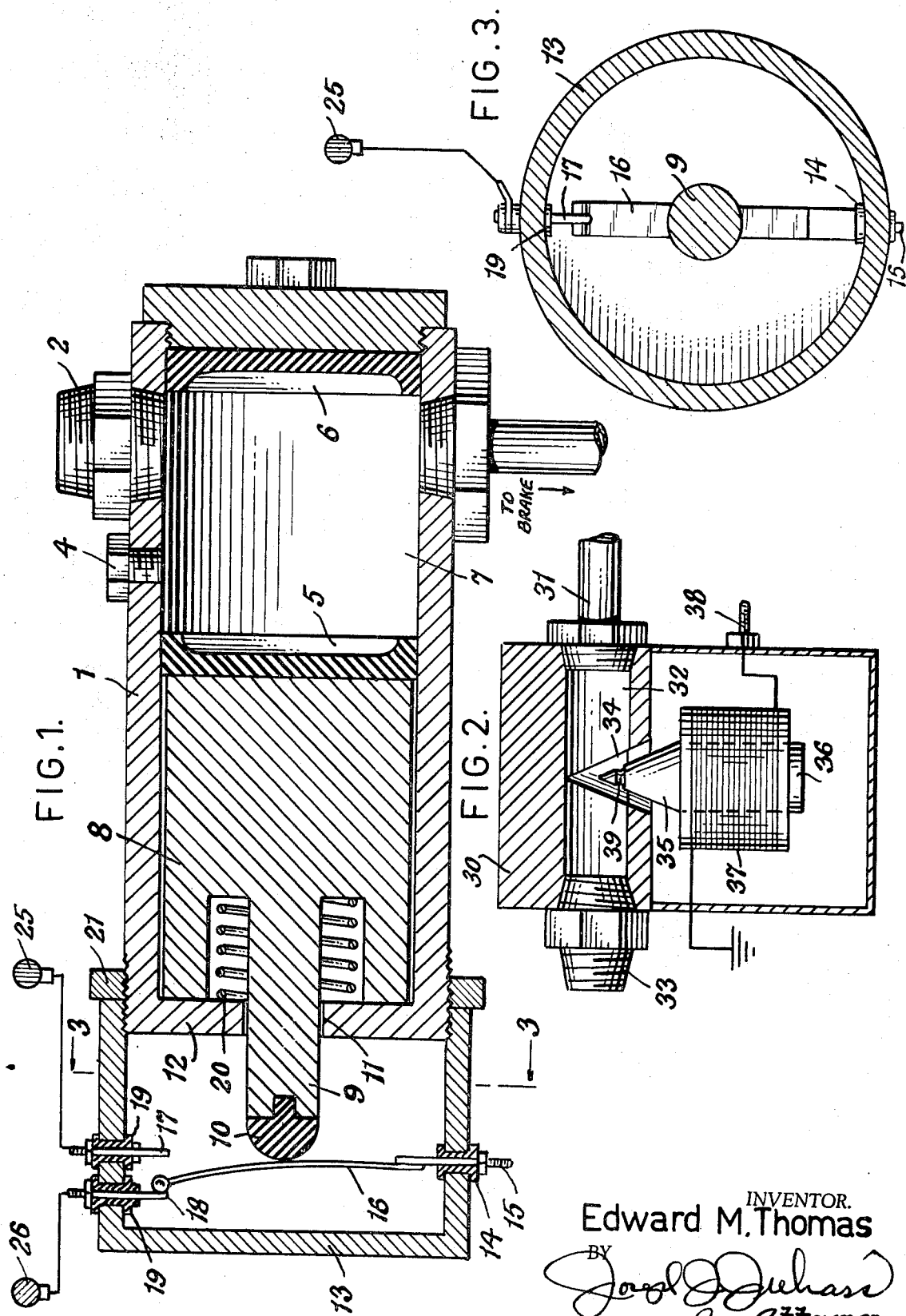

3,546,667
HYDRAULIC BRAKE SYSTEM
Edward M. Thomas, 122 Bement Ave.,
Staten Island, N.Y. 10310
Filed Oct. 25, 1968, Ser. No. 772,470
Int. Cl. B60t 17/22
U.S. Cl. 340—53  3 Claims

ABSTRACT OF THE DISCLOSURE

A device for indicating the residual pressure in a hydraulic brake system so that the driver of a vehicle will be apprized, even before the application of his foot to a brake pedal, whether the brake system is in a properly operating condition. The device includes a cylinder coupled to the brake system and in which residual pressure is normally maintained at a given value. The cylinder contains a piston which is moved to a certain position against spring bias when the pressure within the cylinder is maintained at the required level and at which time a "favorable" signal is operated by the movement of the piston under the required pressure. An unfavorable signal will be actuated by movement of the piston when the spring bias overcomes the lowered residual pressure. A valve is also provided by means of which a reduced gasoline flow to the carburetor will take place at such time as the lowered residual pressure becomes existent in the cylinder.

---

This invention relates to hydraulic brake systems for motor vehicles and has particular reference to a means by which a lowering of the hydraulic fluid pressure in the system will be rendered apparent to the operator of the vehicle to thereby warn him of leakage by the components of the system.

It is a fact that all hydraulic brake systems maintain a slight residual fluid pressure in the entire hydraulic system, and this pressure which is usually between eight and twelve pounds, is existent when the brake pedal is not depressed or in the release position. This residual pressure is maintained in the hydraulic system by means of a spring located in the master cylinder and which seats a valve to maintain the pressure within the lines and in the brake cylinders at eight to twelve pounds. This is done in order to prevent air from entering the system and for other reasons, while the brake pedal is in the released position.

It is an object of the present invention to provide a means by which the vehicle operator can be warned of potential brake trouble, often caused by leakage, even when slight. It is an object of the invention to provide a warning signal means communicating the evidence of leakage to a car operator before he depresses the brake pedal and not after he tries to apply the brake. When evidence of leakage is thus brought to the attention of the car operator he will be alerted and can immediately have the car checked for possible repair to the brake system.

It is another object of the invention to provide means by which the car can be brought to a halt or at least materially slowed down when the pressure in the brake system is lowered and which slow-down or halt will be automatically done without requiring the application of the brakes by pedal depression.

With these and other objects to be hereinafter set forth in view, I have devised the arrangement of parts to be described and more particularly pointed out in the claims appended hereto.

In the accompanying drawing, wherein an illustrative embodiment of the invention is disclosed, FIG. 1 is a longitudinal sectional view of a switching device for actuating a signal to indicate normal or subnormal pressure in the brake system;

FIG. 2 is a sectional view of the valve means for controlling the flow of gasoline to the carburetor, and FIG. 3 is a sectional view, taken substantially on the line 3—3 of FIG. 1, looking in the direction of the arrows.

Referring to the drawing, 1 indicates a cylinder forming part of the signal-transmitting device, the cylinder being adapted to be installed between the master cylinder of the brake system and the main line to the brakes by means of a coupling 2. In cases where dual master cylinders are employed, two of the switches to be described may be used. At 4 is shown a bleeder plug.

Contained within the cylinder 1 are piston cups indicated respectively at 5 and 6, the chamber 7 between the cups 5 and 6 containing hydraulic fluid under pressure of about eight to 12 pounds or more, this pressure being existent without foot pressure being imposed on the brake pedal.

Located beyond the piston cup 5 within the cylinder 1 is a piston 8 slidable in the cylinder and provided at one end with a projecting plug 9. If the plug 9 is composed of electrically conductive material it can be provided with a tip portion 10 composed of insulating material.

The plug 9 is slidably movable through an axial opening 11 in the end wall 12 of the cylinder 1 and said plug enters a cover member or housing 13 that is threadably and adjustably fitted on the end of the cylinder 1 and is maintained in the desired position of adjustment thereon by means of a lock nut 21.

Provided in the side wall of the cover member 13 and insulated therefrom by a bushing 14 of insulation, is a switch terminal 15 carrying a flexible switch blade 16 adapted to electrically contact one or the other of the terminals indicated at 17 and 18. Said terminals 17 and 18 are mounted in the side wall of the cylinder 1 and are insulated therefrom by insulating bushings 19. The flexible switch blade 16 is normally in contact with the terminal 17 when the blade is not under the pressure of the plug 9. The piston 8 and its attached plug 9 are spring biased by means of a soil spring 20 to normally permit the blade 16 to be disposed in contact with the terminal 17 when the blade is not being urged to the left in FIG. 1 by means of pressure that is sufficient to overcome the force of the spring 20. The spring 20 has approximately six pounds thrust and it is thus effective to shift the piston 8 to the right as viewed in FIG. 1 and thereby enabling the switch blade 16 to contact the terminal 17 if and when the fluid pressure in the system and in the chamber 7 of the cylinder 1 is not at the normal residual fluid pressure in the cylinder and in the brake system.

The end of the cylinder 1 remote from the cover member or housing 13, is closed by a threaded closure cap 23.

In the installation of the described device, the master cylinder of the brake system is filled with the hydraulic fluid; the bleeder plug 4 is removed to vent air and is then replaced. The brake pedal should then be depressed firmly to determine if leakage exists. There is at this time between eight and twelve pounds pressure in the chamber 7, which pressure depends upon the spring in the master cylinder and which pressure holds the piston in the position shown in FIG. 1.

With the cover member 13 removed from the end of cylinder 1, the wire from the ignition switch that is "hot" when the ignition key is turned to "on," is attached to the terminal 15. As previously explained, the cover member or housing 13 and the switch blade 16 carried by the terminal 15 are so arranged that the blade 16 will be in constant contact with the terminal 17 as long as the cover member is off the end of the cylinder 1.

The terminal 17 is connected to a red light 25 or to some other visible or audible signal. so that with the ignition key turned on and the cover member 13 off the end of the cylinder 1, the red light 25 will be illuminated or an audible signal sounded. When the cover member 13 is fitted on the end of the cylinder 1 and suitably adjusted thereon, the insulated plug 9 will exert pressure on the switch blade 16 and urge it away from the terminal 17 and into contact with terminal 18 as shown in FIG. 1. The red light 26 will thus be extinguished and a green light 26 or other suitable indicator connected to terminal 18, will be illuminated. The piston 8 and the attached plug 9 are, when the cover member is properly adjusted in place in the cylinder 1, held in the position shown in FIG. 1 by the residual hydraulic fluid pressure in the cylinder 1, and sufficient to overcome the force of the spring 20.

This arrangement is such that while the brake system is in a static condition, that is to say with no foot pressure imposed on the brake pedal, the green light should be illuminated to indicate to the operator of the car that the brake pressure is normal in the system. The installer of the device can readily test the effectiveness of it by opening the bleeder screw 4, dropping the residual hydraulic pressure in the lines to a point below the bias of the spring 20, whereupon the spring 20 will withdraw the piston 8 to an extent to allow the switch blade 16 to contact the terminal 17 and illuminate the red light 25 to indicate residual pressure drop in the brake system.

While I have herein suggested that a red light or an audible signal, such as a buzzer can be used to indicate a lessening of residual fluid pressure in the brake line, a means can be provided by which other signalling devices can be used. Also a valve can be used in the gasoline line to limit the speed of the engine to low speed or idling speed if and when the residual hydraulic pressure is decreased for any reason. Such an arrangement is shown in FIG. 2. Therein is disclosed a housing 30 disposed between the gasoline source and the carburetor. The gasoline supply line from the gasoline source is shown at 31, the same communicating with a passage 32 provided at its opposite end with a coupling 33 by which it can be coupled to the gasoline inlet of the carburetor. Crossing the passage 32 is a conical valve seat 34 against which a valve 35 is adapted to seat, the valve constituting or forming a part of the armature 36 or a solenoid 37. Terminal 17 of the switch device shown in FIG. 1 is electrically connected to terminal 38 mounted on and insulated from the housing 30, said terminal 38 being connected to the coil of the solenoid, the opposite end of the coil being grounded.

The valve 53 has a circumferential groove 39 near its tip. When the terminal 17 is contacted by the switch blade 16 and the red signal is illuminated, the solenoid 37 will be energized and the valve 35 will be closed on seat 34 so that the gasoline flow to the carburetor will be limited to the metered amount that passes through the groove 39. This small amount flowing through the groove 39 permits the engine to have slow or only idling speed. The portion of the housing 30 which contains the valve mechanism is so arranged as to position the valve 35 is opened by gravity and the raising or closing of the valve 35 takes place only when the solenoid 37 is energized and which occurs when the residual pressure in the cylinder 1 is lowered below its normal residual pressure.

From the foregoing, the operation of the protective signalling means will be apparent. As long as the normal residual pressure of the hydraulic fluid is present in the brake system, the green or "go" signal will become illuminated when the ignition key is turned on. The valve 35 will also remain unseated at this time. When there is a lowering of the residual fluid pressure due to leakage or for other cause, the spring 20 will become effective to not only cause the plug 9 to become inoperative on the switch blade 16 and allow the switch blade to contact the terminal 17 to close circuit to the red light 25, but if the valve means of FIG. 2 is used, it will have valve 35 seated to restrict the flow of gasoline as heretofore pointed out to materially reduce the engine speed to indicate to the car operator the need for repair of the brake system to correct leakage and restore the required normal residual pressure.

While I have herein described one form of switch means, it will be apparent that other forms may be employed by which a signal indicating a lowering of residual pressure will be communicated to the car operator. Also, it will be apparent that the switch means of FIGS. 1 and 2 can be employed independently of the gasoline control of FIG. 2 and other changes made without departing from the spirit of the invention.

I claim:

1. In a hydraulic brake system, a cylinder in which residual hydraulic fluid pressure is present at a given value, a piston mounted for sliding movement in the cylinder, an adjustable housing on one end of the cylinder, a pair of switch terminals on said housing, a switch blade mounted in the housing and operative to contact with one or the other of the terminals, one of the terminals being connected to a first signal, the other of the terminals being connected to a second signal, the piston having a projection entering the housing for engagement by the switch blade to move said blade into contact with one of the terminals when the residual hydraulic pressure is at a given value in the cylinder, and spring means operative on the piston when the pressure is below said given value to permit the switch blade to come into contact with the second terminal.

2. In a hydraulic brake system, means for indicating a reduction of residual hydraulic fluid pressure in the system, an electrically-controlled valve arranged in the gasoline line leading to the carburetor, a switch controlled by the residual pressure in the system and arranged to close an electrical circuit to the valve when the fluid pressure drops below a given value, whereby said valve will be moved toward closing and will materially reduce the gasoline flow to the carburetor.

3. In a hydraulic brake system, a cylinder in which a residual hydraulic fluid pressure is normally maintained at a given level without brake pedal pressure, a piston movable in the cylinder and urged in one direction by the said fluid pressure, spring means for urging the piston in the opposite direction upon reduction of the fluid pressure against the piston, a switch including spaced terminals, one of said terminals being connected to a "favorable" signal, the second terminal being connected to an "unfavorable" signal, the switch including an actuator that is caused to contact the terminal for the "unfavorable" signal when the pressure in the cylinder is below a given level and the spring moves the piston away from the actuator, said actuator being movable to the "favorable" terminal when the spring means becomes ineffective to overcome given fluid pressure in the cylinder which moves the piston in a direction toward the actuator to cause it to contact with the "favorable" terminal.

References Cited

UNITED STATES PATENTS 1,936,149   11/1933   Apple _____ 180—82
3,273,116    9/1966   Quiros et al. _____ 340—60

ALVIN H. WARING, Primary Examiner

U.S. Cl. X.R.

340—60, 242; 180—82; 200—82